(12) United States Patent
Debroux-Vincil et al.

(10) Patent No.: US 11,953,147 B2
(45) Date of Patent: Apr. 9, 2024

(54) ADAPTABLE STRUCTURAL MOUNT

(71) Applicants: Michelle Lee Debroux-Vincil, Oak Park, MI (US); William Brian Vincil, Oak Park, MI (US)

(72) Inventors: Michelle Lee Debroux-Vincil, Oak Park, MI (US); William Brian Vincil, Oak Park, MI (US)

(*) Notice: Subject to any disclaimer, the term of this patent is extended or adjusted under 35 U.S.C. 154(b) by 0 days.

(21) Appl. No.: 17/739,472

(22) Filed: May 9, 2022

(65) Prior Publication Data
US 2022/0412506 A1 Dec. 29, 2022

Related U.S. Application Data

(60) Provisional application No. 63/259,157, filed on Jun. 25, 2021.

(51) Int. Cl.
| | |
|---|---|
| *F16M 13/00* | (2006.01) |
| *F16M 11/12* | (2006.01) |
| *F16M 13/02* | (2006.01) |
| *H02S 20/26* | (2014.01) |

(52) U.S. Cl.
CPC ........ *F16M 13/022* (2013.01); *F16M 11/123* (2013.01); *H02S 20/26* (2014.12)

(58) Field of Classification Search
CPC .. F16M 13/022; F16M 11/123; F16M 11/041; F16M 11/10; H02S 20/26
See application file for complete search history.

(56) References Cited

U.S. PATENT DOCUMENTS

| | | | | |
|---|---|---|---|---|
| 5,669,709 | A | * | 9/1997 | Adams .................... F21V 21/08 |
| | | | | 362/396 |
| 6,076,938 | A | * | 6/2000 | Kinderman ............... F21S 4/10 |
| | | | | 362/151 |
| 9,702,503 | B2 | | 7/2017 | Chi Man |
| 10,854,118 | B2 | * | 12/2020 | DeBroux-Vincil ....... G09F 7/08 |
| 2003/0198054 | A1 | * | 10/2003 | Adams .................... F21V 21/08 |
| | | | | 362/396 |
| 2004/0129846 | A1 | * | 7/2004 | Adams .................. F21V 21/088 |
| | | | | 248/301 |

* cited by examiner

*Primary Examiner* — Amy J. Sterling (57) ABSTRACT

A structural mount is used for attaching devices to a gutter. The mount includes a gutter engaging portion and a device engaging portion. The gutter engaging portion including two gutter mounts. The gutter mounts include a spiral hook and a stabilizer. The spiral hook extends above a gutter lip and into a gutter channel such that a proximal point of the spiral hook is positioned against an inner surface of a front wall of the gutter, and the stabilizer contacts an outer surface of the front wall of the gutter when the attachment device is engaged with the gutter. The device engaging portion includes a mounting surface and a mounting plate. The mounting plate is capable of receiving a securing clip attached to a device such that the device may engage with the mounting surface via the mounting plate and the securing clip.

8 Claims, 6 Drawing Sheets

FIG. 6B

ADAPTABLE STRUCTURAL MOUNT

CROSS-REFERENCE TO RELATED APPLICATION

This application claims the benefit of U.S. Provisional Patent Application Ser. No. 63/259,157 filed on Jun. 25, 2021, the disclosure of which is hereby incorporated by reference in its entirety as though fully set forth herein.

TECHNICAL FIELD

This disclosure relates generally to a gutter attachment, more particularly, to a structural attachment that can support various items of substantial weight and size to a building via the gutter.

BACKGROUND

A goal of gutters is to direct precipitation that lands on a building's roof to downspouts and away from the home. Without gutters that function, moisture may settle in and around the building, leading to mold and mildew growth. Warm, moist air may cause condensation on windows and doors, as well as lead to poor indoor air quality. Continued exposure to water may also lead to rot in the wooden components of the building. Additionally, when precipitation is not directed to a downspout, water may collect and cause problems like erosion and flooding around a building's foundation.

More recently, gutters have been utilized in more decorative manners as well. Holiday lights and decorative strings are attached to gutters for display during holiday seasons. Light weight plastic hooks clip easily onto gutters, providing a running board along most of a building's exterior for decorating. While clips may be advantageous for lightweight and temporary decorations, a stronger and more stable system is typically used to hang heavier and more permanent fixtures to a gutter.

It is preferred that exterior attachment systems are unobtrusive, minimizing the size and appearance of clips, hooks, or other attachment methods. Traditional gutter attachment systems involve clips or hangers that are positioned over the lip of a gutter. These traditional attachment methods are unsuitable for securing large or heavy objects to a gutter. Additionally, these traditional attachment methods are not suitable for withstanding severe weather. Wind and heavy precipitation may dislodge or rotate mounts in an undesired manner.

It is also preferred that exterior attachment systems do not interfere with the use and effectiveness of a gutter system. Attachment mechanisms for heavy objects typically utilize nails, screws, or other securing methods which puncture a gutter. Holes in a gutter may lead to problems such as undesired leaks and premature rusting. Additionally securing a device to a gutter through methods such as nails or screws may be difficult, include the use of power tools, and may be dangerous.

Therefore, a need exists for an improved apparatus and system for attaching heavy objects to a gutter that is unobtrusive and without using additional securing methods.

BRIEF DESCRIPTION

The disclosure relates generally to a structural mount for gutters, including a gutter engaging portion and a device engaging portion. The gutter engaging portion contains a gutter mount capable of engaging a gutter, where the gutter mount includes a spiral hook and a stabilizer. The device engaging portion includes a mounting surface, where the mounting surface engages with an object or device to mount to the gutter.

In one embodiment, the spiral hook extends above a gutter lip and into a gutter channel. The stabilizer contacts a front wall of the gutter when the structural mount engages a gutter. The spiral hook includes a proximal end, wherein the proximal end is positioned against an inner wall of the gutter channel.

In one embodiment, the device engaging portion includes a first mounting surface to engage a first object and a second mounting surface to engage a second object. The first mounting surface and the second mounting surface are connected by a hinged corner which may rotate along a perpendicular axis. The first mounting surface includes a first mounting plate that attaches to the first object, and the second mounting surface includes a second mounting plate which attaches to the second object. The first object includes a securing clip, wherein the securing clip is inserted into an opening in the first mounting plate. The second object includes a securing clip, wherein the securing clip is inserted into an opening in the second mounting plate. The securing clip includes a gimbal to permit rotation of the object. In other embodiments, the structural mount includes more than one gutter mount. In some embodiments, the mounting surface includes a tension screw to engage the gutter.

According to another aspect, a structural mount system for gutters includes a gutter, a device, and a mount with a gutter engaging portion and a device engaging portion. The gutter engaging portion includes a gutter mount capable of engaging the gutter with a spiral hook and a stabilizer. The device engaging portion includes a mounting surface capable of engaging the device with a mounting plate and a securing clip.

The spiral hook extends above a gutter lip, and a proximal end of the spiral hook is positioned against an inner surface of a front wall of the gutter. The stabilizer contacts the front wall of the gutter and maintains an amount of force on the front wall. The device engaging portion includes a first mounting surface to engage a first device and a second mounting surface to engage a second device. A first device includes a first securing clip that is capable of being inserted into a first mounting plate attached to a first mounting surface. A second device includes a second securing clip that is capable of being inserted into a second mounting plate attached to a second mounting surface. The securing clip includes a gimbal, such that the device is capable of pivoting about the gimbal while the device is engaged with the gutter. The gutter engaging portion includes two gutter mounts engaged with the gutter. The mounting surface includes a tension screw capable of engaging the front wall of the gutter. In some embodiments, a plurality of devices are capable of engaging the mounting surface.

According to another aspect, a structural mount for gutters includes a structural mount containing a gutter engaging portion and a device engaging portion. The gutter engaging portion includes two gutter mounts, and the gutter mounts each include a spiral hook and a stabilizer. The spiral hook extends above a gutter lip and into a gutter channel such that a proximal point of the spiral hook is positioned against an inner surface of a front wall of the gutter and the stabilizer contacts an outer surface of the front wall of the gutter when the structural mount is engaged with the gutter. The device engaging portion includes a mounting surface and a mounting plate. The mounting plate is capable of receiving a securing clip attached to a device, such that the device may engage with the mounting surface via the mounting plate and the securing clip.

Various other features and advantages will be made apparent from the following detailed description and the drawings. For example, it will be apparent by the disclosure that the method and system disclosed could be used in various other environments, for example, hanging objects inside, or on other objects such as a fence or shed, if so desired.

DETAILED DESCRIPTION

Referring now to the discussion that follows and the drawings, illustrative approaches to the disclosed apparatus are described in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive, otherwise limit, or restrict the claims to the precise forms and configurations shown in the drawings and disclosed in the following detailed description.

The system of the disclosed examples is described with respect to an adaptable structure mount for attaching devices to a gutter, and more particularly, to an apparatus for attaching electronic and non-electronic devices to a gutter without using screws, nails, or other additional securing devices that would penetrate the gutter system.

The present invention improves performance of gutter attachment systems, providing increased stability to attach and hold cumbersome and heavy objects to a gutter. The system increases the lifetime of gutter systems, eliminating penetration of a gutter with screws or nails that can rust, leak, and fall out of the gutter. The system improves the lifetime of the attached devices, creating a system that can be removed from the gutter with ease by a user when desired.

Figure 1:
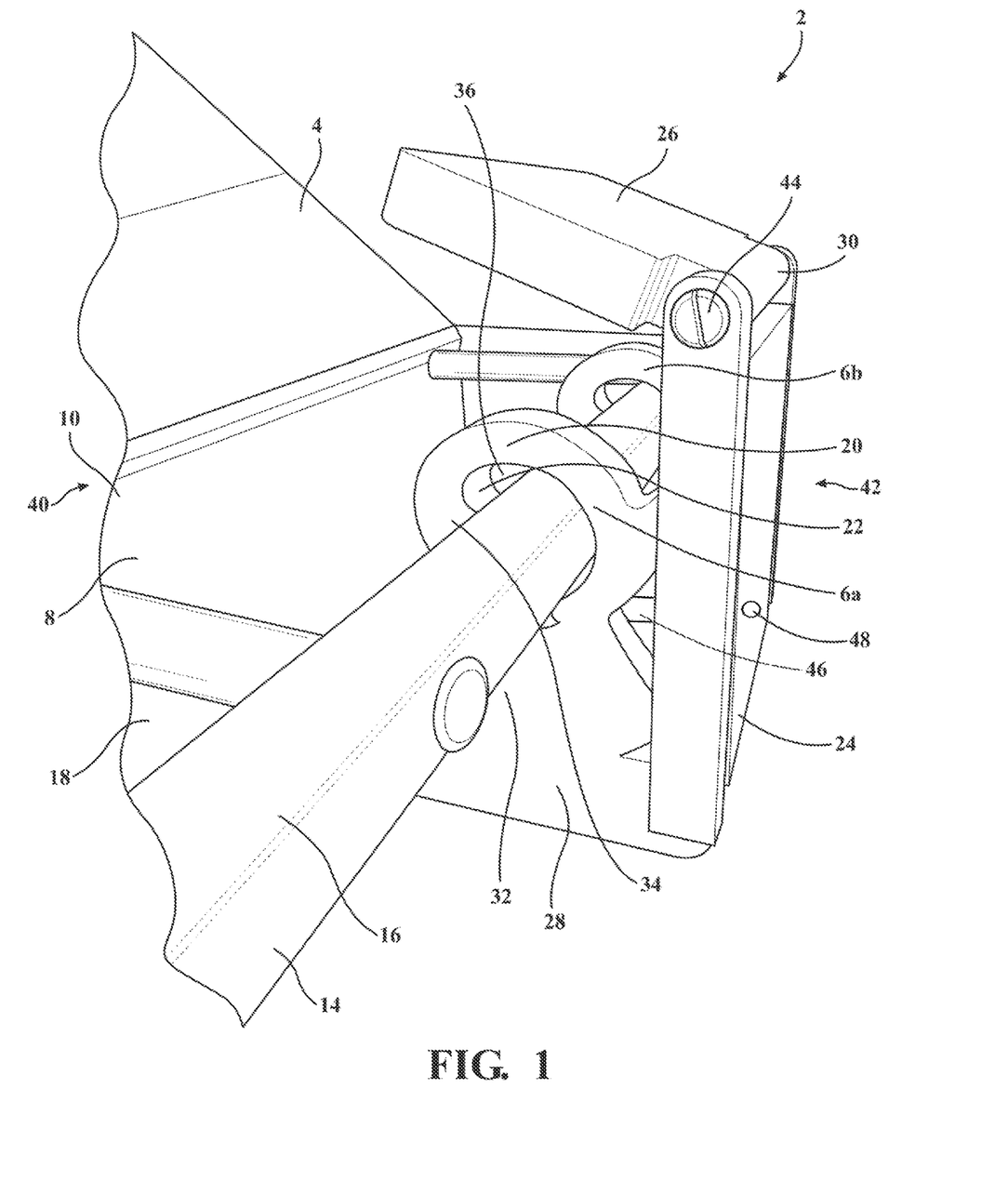
FIG. 1 illustrates an adaptable structural mount in use on a gutter of a building.

Referring to the figures, a structural mount is disclosed and illustrated in FIGS. 1-6. FIG. 1 illustrates a structural mount 2 that includes a gutter engaging portion 40 and a device engaging portion 42. Gutter engaging portion 40 is a portion of structural mount 2 that attaches structural mount 2 to gutter 8. Device engaging portion 42 is a portion of structural mount 2 that attaches structural mount 2 to a device or object 60, 62. Gutter engaging portion 40 includes a gutter mount 6 that may include gutter mount 6a and gutter mount 6b, both engageable with a gutter 8, wherein gutter mounts 6a and 6b each include a spiral hook 20 and a gutter stabilizer 32. Device engaging portion 42 includes mounting surfaces 24, 26, with mounting surface 24, 26 engaging with an object or device 60, 62 to mount to gutter 8 in one or both locations. Mounting surfaces may also be a front surface or top surface, or a front wall or top wall. Object or device may also be a top surface mounting object, front surface mounting object, or attaching object.

Structural mount 2 is attached to the exterior of a building 4. Structural mount 2 engages with gutter 8 to secure to exterior of building 4. In one embodiment, structural mount 2 may include two gutter mounts 6a and 6b to secure structural mount to gutter 8.

Gutter 8 may be of different designs and shapes. Generally, gutter 8 will include a back wall 10 and a front wall 14, as well as a bottom. Back wall 10 may abut up to an exterior of building 4. Affixed to back wall 10, bottom generally extends from back wall 10 in a direction perpendicular to exterior of building 4. Front wall 14 affixes to bottom, extending upward. Back wall 10, bottom, and front wall 14 form a generally u-shaped channel 18 for water to collect and run through. Attached to front wall 14 is a lip 16 that extends into gutter channel 18.

Structural mount 2 generally includes gutter engaging portion 40 and device engaging portion 42. In one embodiment, device engaging portion 42 may include front surface 24 and top surface 26. Device engaging portion 42 may additionally have only one surface for attaching smaller or singular objects to gutter 8. Front surface 24 and top surface 26 may be attached at a corner 30 with a hinge 44, such that an angle between front surface 24 and top surface 26 may be changed. Hinged corner 30 may rotate along a perpendicular axis on hinge 44 allowing top surface 26 to be positioned at a variety of angles compared to front surface 24. In another example, front surface 24 and top surface 26 may be attached at a fixed corner 30.

Gutter engaging portion 40 of structural mount 2 may include two gutter mounts 6a, 6b. Structural mount 2 may include more or less gutter mounts. For example, when structural mount 2 is for a small and light object, structural mount 2 may include one gutter mount 6. When structural mount 2 is for several objects or heavy objects, more than two gutter mounts 6 may be used to provide additional stability on gutter 8.

Gutter mounts 6a, 6b each include spiral hook 20. Spiral hook 20 engages gutter 8 at gutter lip 16 by extending above gutter lip 16. Spiral hook 20 includes an inner wall 22 that wraps around gutter lip 16. Spiral hook 20 includes proximal point 34 at end of spiral hook 20. Spiral hook 20 and proximal point 34 create a space 36 between a curve of spiral 20. When engaged with gutter 8, gutter lip 16 fits in space 36 formed by spiral hook 20, such that proximal point 34 abuts against an internal surface of gutter lip 16 and front wall 14, the internal surface being the side of front wall 14 which is inside gutter channel 8.

Spiral hook 20 and proximal point 34 hold gutter mounts 6a, 6b securely against gutter 8. Various sizes of spiral hook 20 may fit different size and shaped gutters 8. In some embodiments, gutter 8 may include a tighter spiral to fit a small gutter lip. In a different embodiment, a wider spiral may accommodate a larger gutter lip. In addition to spiral hook 20 and proximal point 34, gutter engaging portion 40 of structural mount 2 may include a gutter stabilizer 32. Gutter stabilizer 32 engages gutter 8, such that gutter stabilizer 32 contacts outside surface of front wall 14 of gutter 8 to maintain an upright position of structural mount 2 by maintaining an amount of force on front wall 14 due to gravity and mass of mount and object.

Gutter mount 6 may be made of any material such that spiral 20 may be flexed over lip 16 of gutter 8. The material should also be rigid to support attached objects and withstand elements of the outdoors. In some embodiments, the material may be made of nylon or aluminum. Additionally, materials such as steel, polypropylene, polycarbonate, polyethylene, or HDPE may be used. Varying sizes may be used to accommodate different sizes and weights of attached objects, as well as different shapes and sizes of gutters.

Structural mount 2 may include a tension screw 46 to provide added stability to structural mount 2 while positioned on gutter 8. For example, tension screw 46 may be inserted through front surface 24 of structural mount 2, such that tension screw 46 is tightened against front wall 14 of gutter 8. Tension screw 46 is tightened to push against front wall 14 with force, without penetrating front wall 14 of gutter 8. Tension screw 46 may be inserted into a shallow cavity 48 in front surface 24 of mount, such that when tightened, the head of tension screw 46 is below the surface level of front surface 24 such that screw 46 does not prohibit attachment of object 62 to front surface 24 and is hidden by object 62 when object 62 is attached to structural mount 2.

Figure 2:
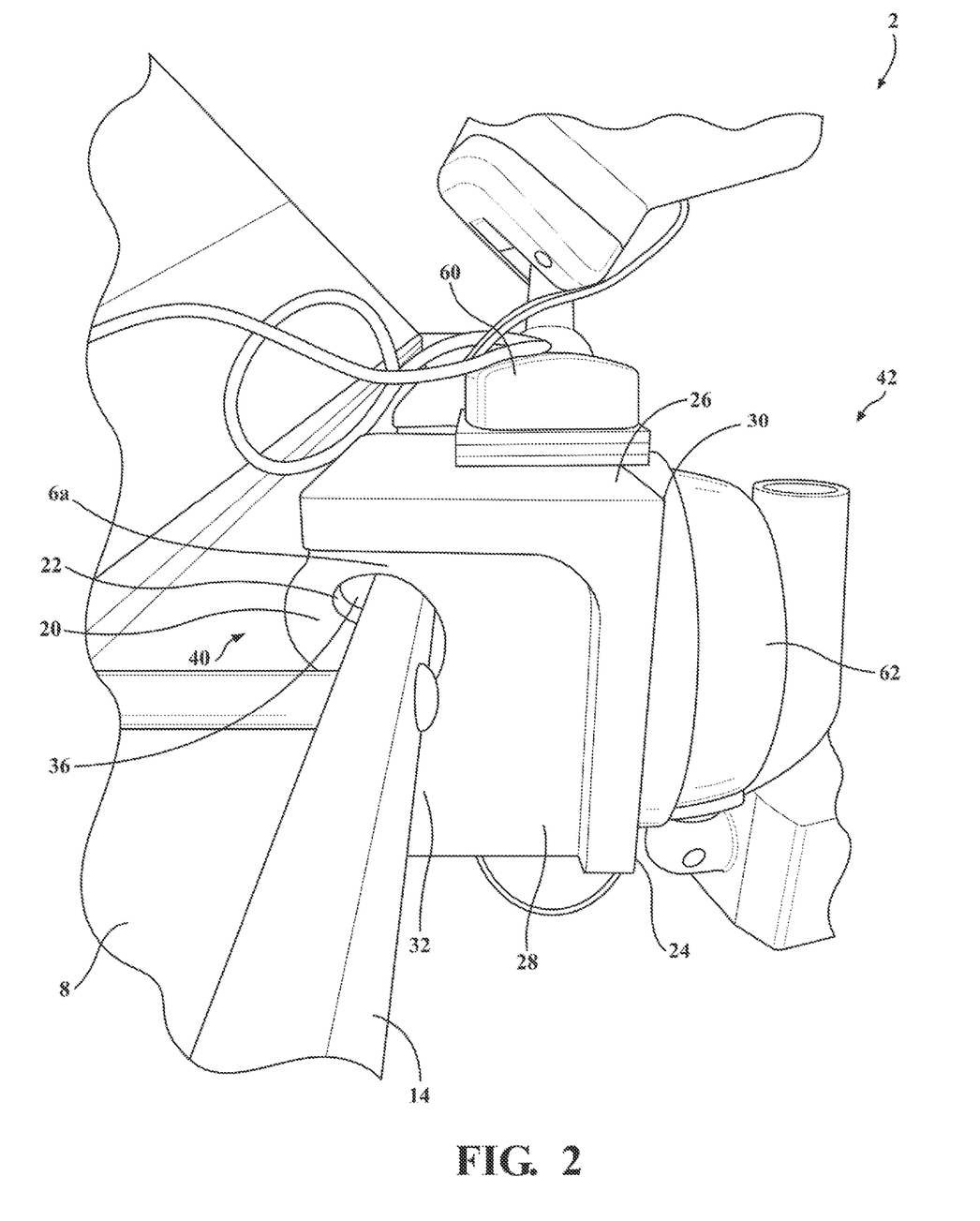
FIG. 2 illustrates a side view of an adaptable structural mount attached to a gutter.

Referring to FIG. 2, another embodiment of structural mount 2 is illustrated. Device engaging portion 42 includes front wall 24 and top wall 26. Front wall 24 and top wall 26 are connected at a fixed 90-degree corner 30. In one example, corner 30 is a fixed corner and may provide increased stability and strength for heavier objects. Additionally, device engaging portion 42 may include a side surface 28. Side surface 28 extends from front wall 24 and top wall 26, creating an enclosed space between gutter engaging portion 40 and device engaging portion 42. Side surface 28 provides additional strength and support to structural mount 2 for heavier objects. Side surface 28 may include stabilizer 32, contacting front wall 14 of gutter 8. Side surface 28 may be a fully enclosed wall such as illustrated in FIG. 2, but side surface 28 may also have decorative cutouts and designs as illustrated in FIG. 1.

As illustrated in FIG. 2, structural mount 2 may include multiple attached objects or devices. In one example, structural mount 2 may include a top surface attaching object 60 and a front surface attaching object 62. In another example, structural mount 2 may include one attaching object on either of top surface 26 or front surface 24. In a further example, structural mount 2 may include more than one attaching object on either or both of top surface 26 and front surface 24. Attaching objects may be electronic or non-electronic objects or devices. Examples of electronic objects may include, but are not limited to, cameras, spotlights, or beacons. Non-electronic objects may include, but are not limited to flags, holiday decorations, or plant arrangements.

Figure 3:
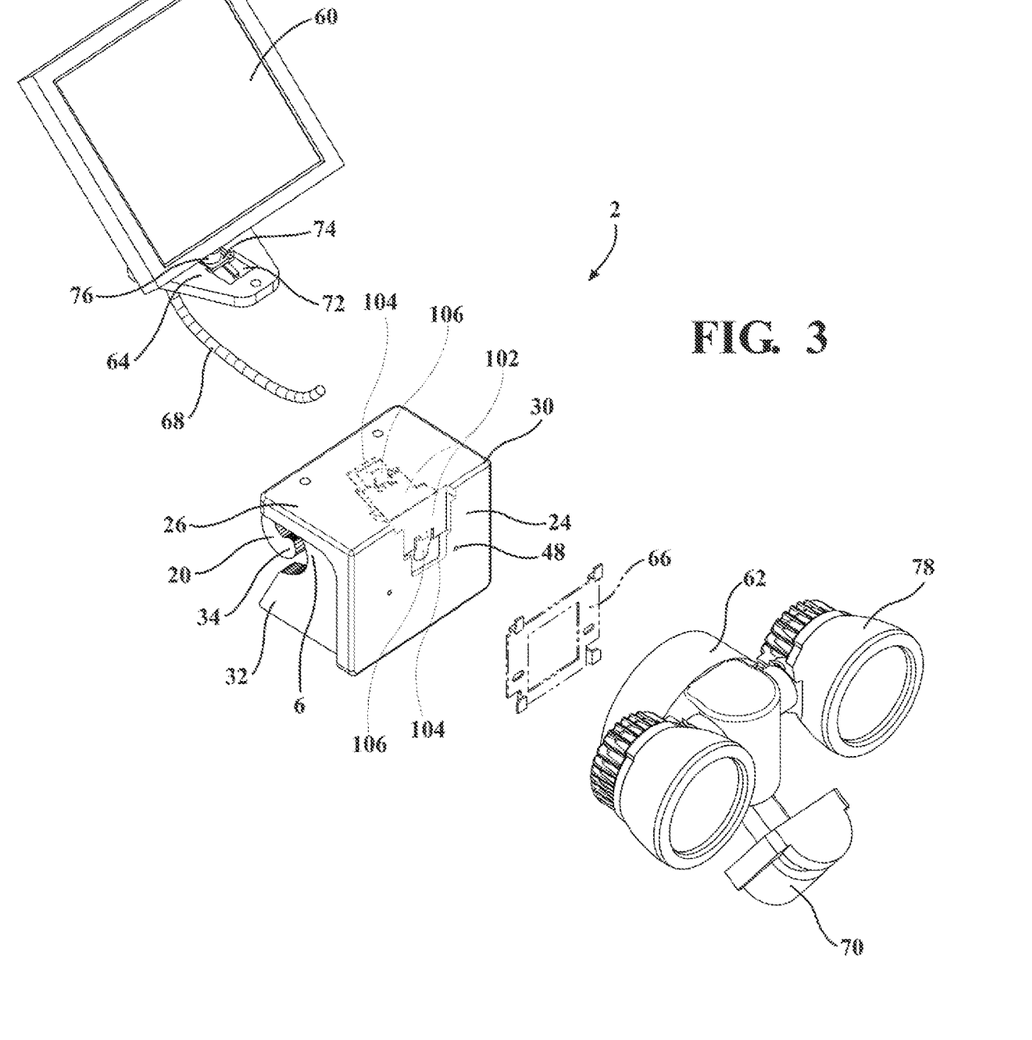
FIG. 3 illustrates an exploded view of an adaptable structural mount.

FIG. 3 illustrates an exploded view of structural mount 2. In one embodiment, top surface attaching object 60 is affixed to top surface 26 via a top surface mounting plate 64. Top surface mounting plate 64 is attached to top surface 26 via screws, nails, or other securing devices. Top surface mounting plate 64 may include an opening 72 for receiving a securing clip 74. Securing clip 74 may be attached to top surface attaching object 60 to be inserted into opening 72 on top surface mounting plate 64. Securing clip 74 may include a gimbal 76 to permit rotation and pivoting of top surface attaching object 60 by hand.

Top surface mounting plate 64 is an optional method of attachment. Top surface attaching object 60 may be attached to top surface 26 by a snap in mount 102. Snap in mount 102 is configured to attach top surface attaching object 60 without the use of tools. Base of top surface attaching object 60 is inserted into an aperture 104 of snap in mount 102 that is designed to accept the base of top surface attaching object 60. Top surface attaching object 60 is positioned in snap in mount 102 and attaching clip 106 secures top surface attaching object 60 to top surface 26.

Top surface attaching object 60 may be any variety of objects including, but not limited to a device such as a solar panel. Top surface attaching object 60 may include a power cord 68. Power cord 68 may be for supplying power to a top surface attaching object 60. In another embodiment, such as with a solar panel, power cord 68 may be used to supply power from a top surface attaching object 60 to a front surface attaching object 62.

As illustrated in FIG. 3, structural mount 2 may include two attaching surfaces 26, 24. Front surface attaching object 62 may be attached to a front surface 24 via a front surface mounting plate 66. Front surface attaching object 62 may include a plurality of objects and devices. For example, front surface attaching object 62 may include a spotlight 78 and a motion sensor 70. Front surface mounting plate 66 may be optionally used to attach front surface attaching object 62. Front surface 24 may additionally include a shallow cavity 48 for receiving a tension screw 46 to provide additional stability to structural mount 2 when positioned on gutter 8.

Structural mount 2 may be manufactured such that front surface 24 includes a snap-in-mount 102. Snap-in-mount 102 in one example is a depression or undercut from front surface 24 and/or top surface 26 and configured such that a base of front surface attaching object 62 may be inserted into snap-in-mount 102 and clipped into place without the use of tools. Snap-in-mount 102 includes an aperture 104 for receiving a portion of the front surface attaching object 62 base. Snap-in-mount 102 includes an attaching clip 106 which clasps against front surface attaching object 62 to secure object in place on front surface 24. Snap-in-mount 102 may be utilized on top surface 26 of structural mount 2. Snap-in-mount 102 eliminates the use of tools to attach front surface attaching object 62 or top surface attaching object 60 because object 60, 62 slide in and clips into place.

Figure 4:
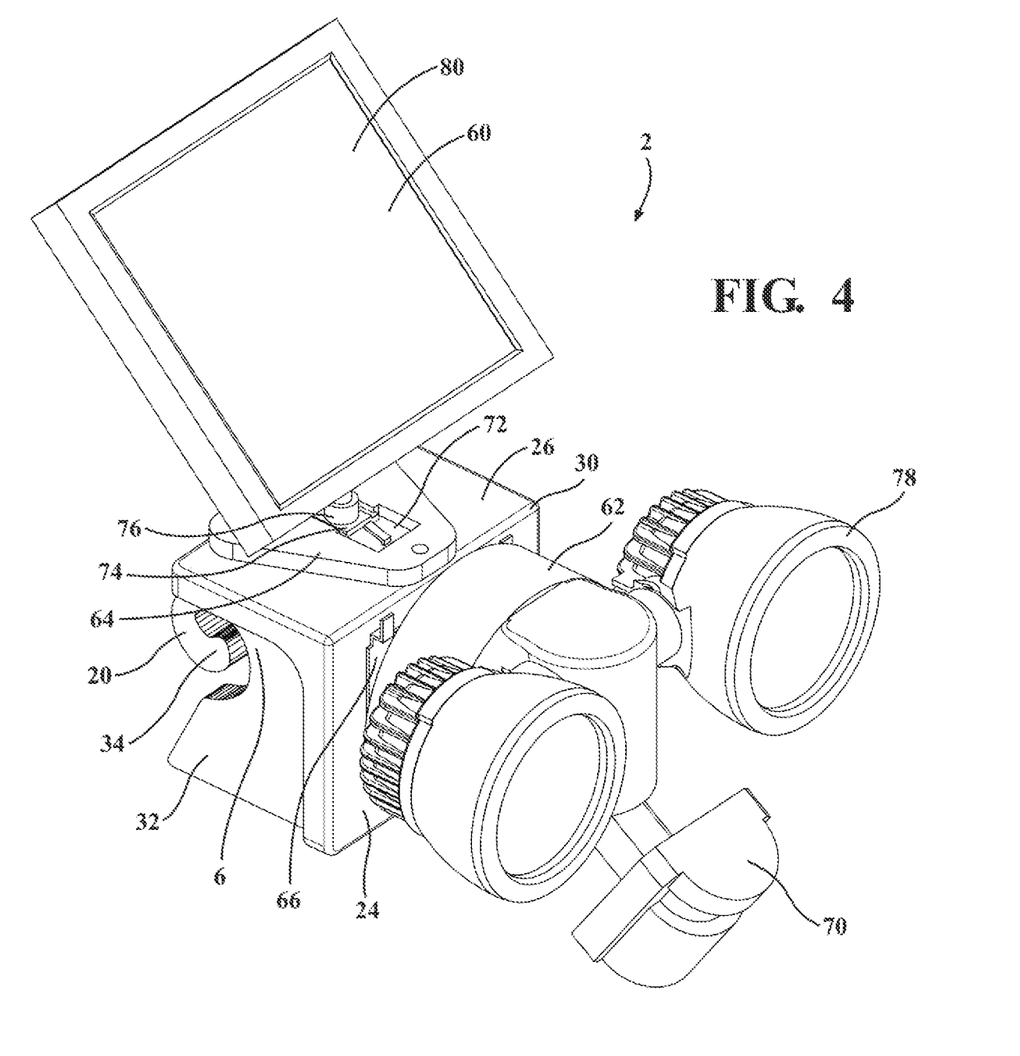
FIG. 4 illustrates a perspective view of an adaptable structural mount with two mounting surfaces.

FIG. 4 illustrates a perspective view of structural mount 2 with front surface 24 and top surface 26 connected by corner 30 at a 90-degree angle. Front surface 24 and top surface 26 include attaching objects that are attached thereto. Front surface 24 includes a front surface attaching object 62, illustrated as spotlight 78 and motion sensor 70. Front surface attaching object 62 is attached to front surface 24 by front surface mounting plate 66. Top surface 26 may include top surface attaching object 60, illustrated as solar panel 80 with power cord 68. Top surface attaching object 62 is attached to top surface 26 by top surface mounting plate 64. Top surface attaching object 62 may also Referring to FIG. 5, another embodiment includes structural mount 2 with one mounting surface 82. Mounting surface 82 is positioned, in one example, at approximately a 45-degree angle, however mounting surface 82 may be attached at a variety of angles. For example, mounting surface 82 may additionally lie flat across as top surface, or mounting surface 82 may stand upright as a front surface. Mounting surface 82 is positioned between two gutter mounts 6a, 6b. Additional gutter mounts may be used to provide additional stability for a larger device. Side surfaces 28 provide structure for gutter mounts 6a, 6b. Mounting surface 82 is attached to the top of side surfaces 28.

Figure 5:
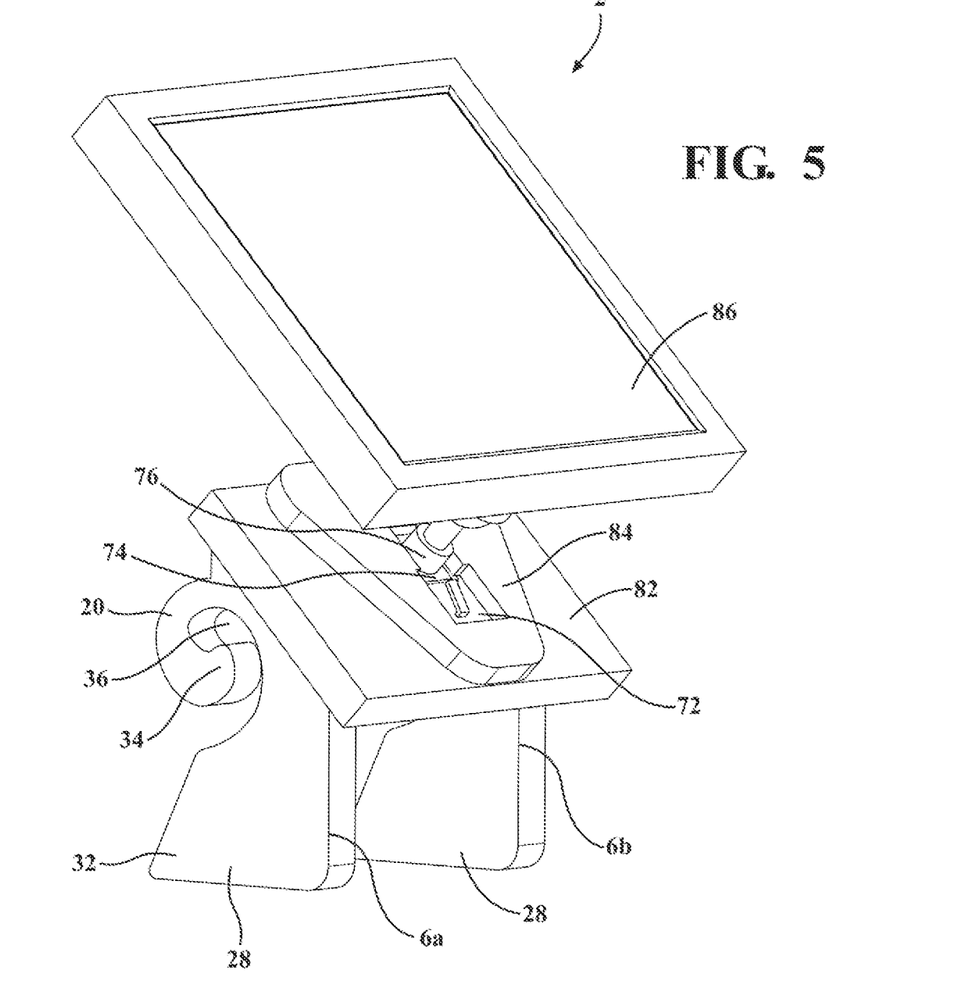
FIG. 5 illustrates a perspective view of an adaptable structural mount with one mounting surface.

As illustrated in FIG. 5, structural mount 2 with one mounting surface 82 may include mounting plate 84. Mounting plate 84 may include opening 72 for receiving and locking securing clip 74. Securing clip 74 is attached to attaching object 86, such that attaching object 86 with securing clip 74 locks into place in opening 72 of mounting plate 84. Securing clip 74 may additionally include gimbal 76 for pivoting and rotating of attaching object 86 without moving structural mount 2 on gutter 8. Attaching object 86 may additionally be attached to mounting surface 82 with a snap-in mount such that attaching object slides into an aperture designed to fit the base of attaching object 86 and secures with a attaching clip.

Figure 6A:
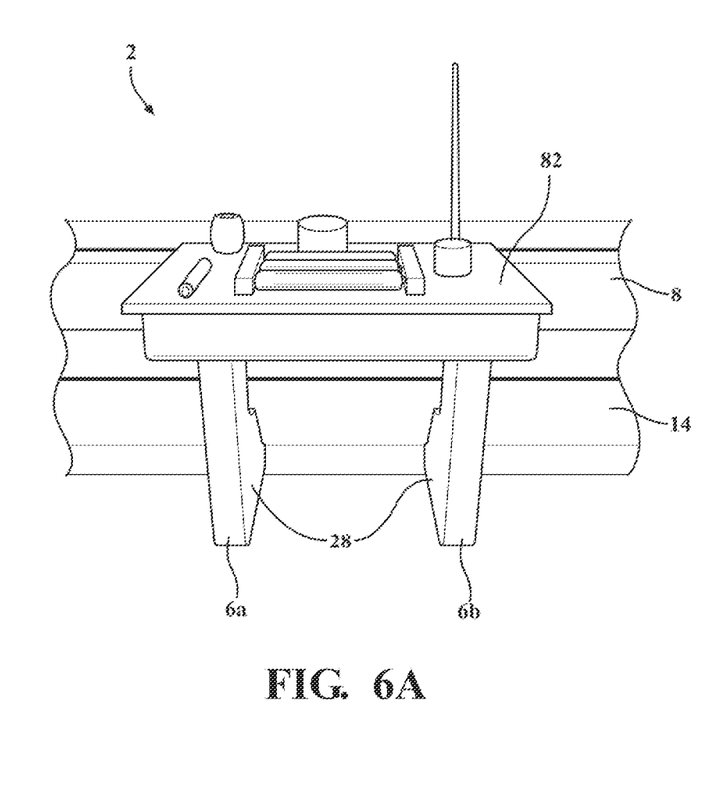
FIG. 6A illustrates a side view of an adaptable structural mount with a top mounting surface.

Referring now to FIG. 6A, structural mount 2 may include one mounting surface 82 positioned as top surface. Mounting surface 82 is attached to top of side surfaces 28. Mounting surface 82 extends from gutter engaging portion 40 to device engaging portion 42 of side surface 28. Structural mount may include more gutter mounts 6 to support larger or heavier attaching objects.

Figure 6B:
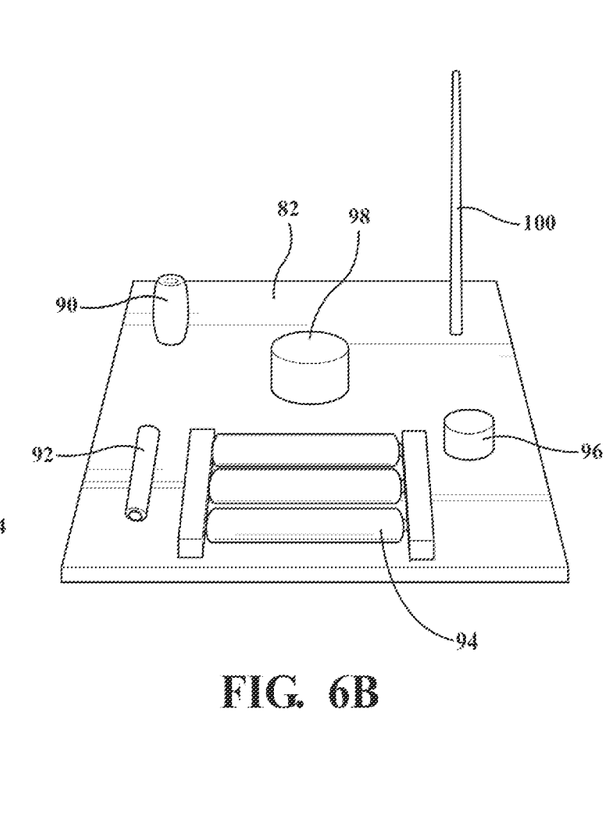
FIG. 6B illustrates a top view of an adaptable structural mount with a top mounting surface.

As shown in FIG. 6B, mounting surface 82 may include a plurality of small devices attached to one mounting surface 82. For example, a mounting surface 82 may include a plurality of devices such as a router 90, a radio frequency Wi-Fi device 92, a power source or battery 94, a global positioning system device 96, a controller 98, or an antenna 100. Attaching objects may be spread about the mounting surface 82. Mounting surface 82 may include one attaching object or several. Mounting surface 82 may be larger or small to support various amounts and sizes of attaching objects.

Attaching objects may be connected to the mounting surface of the structural mount 2 through a variety of methods. For example, attaching objects may be connect via mounting plates. Additionally, other methods and apparatus may be used. For example, attaching objects may be connected directly to mounting surface via the use of securing devices such as screws or nails. Moreover, structural mount 2 may be manufactured to include snap on clips that incorporate the design of traditional spotlights, security cameras, and other attaching objects to slide in and snap into place on the mounting surface.

Manufacture of a mounting surface to include design or space built for traditional attaching objects may eliminate the use of tools throughout the assembly process. For example, a mounting surface may be manufactured to include a space built to hold and attach to the base of a solar panel without using a mounting plate.

The structural mount is configured to attach to a gutter with the use of a spiral hook. When engaged with a gutter, the spiral hook is positioned over a gutter lip such that the spiral hook remains wrapped around the gutter and forced against the inner surface of a gutter wall. Stabilizer of structural mount engages gutter at a second location on the outside surface of a gutter wall to keep the gutter positioned. Combined use of the spiral hook and stabilizer keeps the mount positioned even during severe weather. Further security of the mount can be acquired through the use of non-puncturing securing devices such as a tension screw against the front wall of a gutter.

The use of a spiral hook and stabilizer to attach a mount to a gutter eliminates the need for the mount to be attached with a securing device that punctures the gutter. With the device as disclosed, there are no holes in the gutter for securing, such as nails or screws are unnecessary to attach the mount. As such, the structure of the gutter, including the paint and metal, are preserved and the integrity of the gutter remains such that premature rusting or leaks do not occur.

The use of mounting plates and mounting surfaces allows heavier objects to be connected to the structural mount. A mounting plate adds security and strength to the connection between the connected device and the structural mount. A flat mounting surface allows connected devices to be attached by multiple methods including via nails or screws without affecting the integrity of the gutter. With this connection, heavy devices such as floodlights or solar panels may be attached to a gutter that would be otherwise unsecure on traditional gutter, such as with clips and hooks. To provide additional movement of a connected device once attached to the securing mount, a gimbal on the mounting plate allows a device to be rotated and pivoted once attached to a gutter.

According to the disclosure, a structural mount for gutters, comprising a gutter engaging portion and a device engaging portion. The gutter engaging portion includes a gutter mount capable of engaging a gutter, wherein the gutter mount includes a spiral hook and a stabilizer. The device engaging portion includes a mounting surface, wherein the mounting surface engages with an object to mount to the gutter.

Also according to the disclosure, a system for gutters includes a gutter, a device, and a mount with a gutter engaging portion and a device engaging portion. The gutter engaging portion includes a gutter mount capable of engaging the gutter with a spiral hook and a stabilizer. The device engaging portion include a mounting surface capable of engaging the device with a mounting plate and a securing clip.

Also according to the disclosure, a structural mount for gutters including an attachment device containing a gutter engaging portion and a device engaging portion. The gutter engaging portion including two gutter mounts, the gutter mounts includes a spiral hook and a stabilizer. The spiral hook extends above a gutter lip and into a gutter channel such that a proximal point of the spiral hook is positioned against an inner surface of a front wall of the gutter and the stabilizer contacts an outer surface of the front wall of the gutter when the attachment device is engaged with the gutter. The device engaging portion includes a mounting surface and a mounting plate. The mounting plate is capable of receiving a securing clip attached to a device such that the device may engage with the mounting surface via the mounting plate and the securing clip.

When introducing elements of various embodiments of the disclosed materials, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While the preceding discussion is generally provided in the context of attaching objects to a gutter, it should be appreciated that the present techniques are not limited to such means. The provision of examples and explanations in such a manner on a gutter is to facilitate explanation by providing instances of implementations and applications. The disclosed approaches may also be utilized in other contexts, such as attaching to fences, garden boxes, or other objects with a wall for attachment.

While the disclosed materials have been described in detail in connection with only a limited number of embodiments, it should be readily understood that the embodiments are not limited to such disclosed embodiments. Rather, that disclosed can be modified to incorporate any number of variations, alterations, substitutions or equivalent arrangements not heretofore described, but which are commensurate with the spirit and scope of the disclosed materials. Additionally, while various embodiments have been described, it is to be understood that disclosed aspects may include only some of the described embodiments. Accordingly, that disclosed is not to be seen as limited by the foregoing description, but is only limited by the scope of the appended claims.

What is claimed is:

1. A structural mount for gutters comprising:
a gutter engaging portion and a device engaging portion, the gutter engaging portion having at least one gutter mount configured to engage a gutter, the gutter mount further comprising a spiral hook and a stabilizer, wherein the device engaging portion further comprised at least one mounting surface, the at least one mounting surface configured to engage with a device to mount to the gutter;
wherein the at least one mounting surface comprises:
a first mounting plate attachable to the first mounting surface; and
a second mounting plate attachable to the first mounting surface;
the first mounting plate configured to attach to a first device, and the second mounting plate configured to attach to a second device.

2. The apparatus of claim 1, further comprising:
a securing clip attached to at least one of the first device and the second device, the securing clip configured to be inserted into an opening in at least one of the first mounting plate and the second mounting plate.

3. The apparatus of claim 2, further comprising:
a gimbal attached to the securing clip;
the gimbal configured to permit rotation of at least one of the devices.

4. A structural mount for gutters, comprising:
a gutter engaging portion and a device engaging portion;
the gutter engaging portion having at least one gutter mount configured to engage a gutter, the gutter mount further comprising a spiral hook and a stabilizer;
the device engaging portion further comprising at least one mounting surface, the at least one mounting surface configured to engage with a device to mount to the gutter;
a tension screw inserted into the at least one mounting surface, the tension screw configured to engage a front wall of the gutter to secure the structural mount.

5. A structural mount system for gutters comprising:
a gutter;
at least one device; and
a mount, the mount having a gutter engaging portion and a device engaging portion, wherein the gutter engaging portion includes at least one gutter mount capable of engaging the gutter, the gutter mount having a spiral hook and a stabilizer, and wherein the device engaging portion includes at least one mounting surface capable of engaging the at least one device, the device engaging portion comprising:
a mounting plate
a first securing clip of the at least one securing clip attached to the first device; and
a second securing clip of the at least one securing clip attached to the second device; wherein the first securing clip is configured to be inserted into the first mounting plate attached to the first mounting surface, and the second securing clip configured to be inserted into a second mounting plate attached to a second mounting surface.

6. The structural mount system of claim 5, further comprising:
a gimbal attached to at least one securing clip;
the gimbal configured such that the at least one device is capable of pivoting about the gimbal when the at least device is engaged with the gutter.

7. A structural mount system for gutters, comprising:
a gutter;
at least one device; and
a mount with a gutter engaging portion and a device engaging portion;
the gutter engaging portion including at least one gutter mount capable of engaging the gutter with a spiral hook and a stabilizer;
the device engaging portion including at least one mounting surface capable of engaging the at least one device with a mounting plate and at least one securing clip; and
a tension screw inserted into the mounting surface; the tension screw configured to engage the front wall of the gutter.

8. A structural mount for gutters, comprising:
a gutter engaging portion and a device engaging portion;
the gutter engaging portion including a plurality of gutter mounts, the plurality of gutter mounts having a spiral hook and a stabilizer;
the spiral hook extending above a gutter lip and into a gutter channel such that a proximal point of the spiral hook is positioned against an inner surf ace of a front wall of the gutter and the stabilizer contacting an outer surface of the front wall of the gutter when the structural mount is engaged with the gutter; and
the device engaging portion including an at least one mounting surf ace and an at least one mounting plate;
the mounting plate capable of receiving a securing clip attached to at least one device, such that the at least one device engages with the mounting surf ace via the securing clip being configured to be inserted into the mounting plate and the mounting plate being configured to be attached to the mounting surface.

* * * * *